Patented June 18, 1940

2,204,607

UNITED STATES PATENT OFFICE 2,204,607

AZO COMPOUNDS AND PROCESS FOR COLORING THEREWITH

James G. McNally and Joseph B. Dickey, Rochester, N. Y., assignors to Eastman Kodak Company, Rochester, N. Y., a corporation of New Jersey No Drawing. Application November 12, 1938, Serial No. 240,115

7 Claims. (Cl. 260—206)

This invention relates to the art of dyeing or coloring. More particularly, it relates to new aromatic azo dye compounds and the application of the nuclear non-sulfonated dye compounds for the coloration of organic derivatives of cellulose, particularly textile materials made of or containing an organic derivative of cellulose, by dyeing, printing, stenciling, or like methods.

Organic derivatives of cellulose are characterized by an indifferent affinity for the usual cotton and wool dyes especially the ordinary water soluble dyes. Because of this, it has been necessary to develop new dye compounds suitable for the dyeing or coloration of materials, such as textile materials, made of or containing an organic derivative of cellulose. It is, accordingly, an object of our invention to provide a new class of aromatic azo dyes suitable for the dyeing or coloration of organic derivatives of cellulose. Another object is to provide a process for the coloration of organic derivatives of cellulose in which the dye or dyes are applied directly from an aqueous suspension to the material undergoing coloration. A further object is to produce dyeings on organic derivatives of cellulose which are of good fastness to light and washing. Other objects will hereinafter appear.

Typical organic derivatives of cellulose include the hydrolyzed as well as the unhydrolyzed cellulose organic acid esters such as cellulose acetate, cellulose formate, cellulose propionate, or cellulose butyrate and the hydrolyzed as well as the unhydrolyzed mixed organic acid esters of cellulose such as cellulose acetate-propionate, cellulose acetate-butyrate, and the cellulose ethers such as methyl cellulose, ethyl cellulose, or benzyl cellulose. While our invention will be illustrated more particularly in connection with the coloration of cellulose acetate, a material to which the invention is especially adapted, it will be understood that it applies to the coloration of other organic derivatives of cellulose such as those just mentioned.

The azo dye compounds of our invention have the general formula:

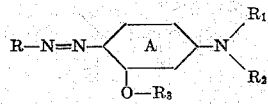

wherein R represents the residue of an aromatic nucleus, $R_1$ and $R_2$ each represents a member selected from the group consisting of hydrogen, an alkyl group, an allyl group, a cycloalkyl group, an aryl group and a heterocyclic group, $R_3$ represents the residue of a benzene nucleus which may be substituted and A means the benzene nucleus so designated may be substituted. The benzene nucleus designated A, however, should not contain a nuclear sulfonic acid group.

It will be understood that alkyl, as used herein, unless otherwise stated, includes not only unsubstituted alkyl groups, such as a methyl group, an ethyl group or a propyl group but also substituted alkyl groups such as β-hydroxyethyl, β,γ-hydroxypropyl, β-methoxyethyl or β-ethoxyethyl, for example. Illustrative of cycloalkyl may be mentioned cyclohexyl.

The azo dye compounds of our invention can be prepared by diazotizing a suitable primary aromatic amine and coupling the diazonium compound obtained with a coupling compound having the general formula:

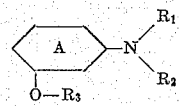

wherein A, $R_1$, $R_2$ and $R_3$ have the meaning previously assigned to them.

As previously indicated, the nuclear non-sulfonated aromatic azo dye compounds of our invention constitute valuable dyes for the coloration of organic derivatives of cellulose such as those hereinbefore mentioned, yielding various shades thereon of good fastness to light and washing. These nuclear non-sulfonated dye compounds likewise possess application for the dyeing of wool and silk and yield generally similar shades on these materials as on organic derivatives of cellulose. Compounds in which the aromatic nucleus designated R contains a nuclear sulfonic acid group can likewise be prepared in known fashion. These compounds possess little or no utility for the coloration of organic derivatives of cellulose but can be employed to color textile materials such as wool and silk, yielding various shades thereon. For the dyeing of organic derivatives of cellulose such as cellulose acetate silk, nuclear non-sulfonated compounds wherein R is a phenyl residue are generally advantageous. Said phenyl residue may be substituted as clearly shown herein.

The following examples illustrate the preparation of the azo dye compounds of our invention:

Example 1

13.8 grams of p-nitroaniline are diazotized in the usual manner and the diazonium compound obtained is added slowly to a cold hydrochloric acid solution of 18.5 grams of m-amino-diphenyl ether. Coupling is completed by adding sodium acetate. The dye is filtered, washed and dried. The dye compound obtained colors cellulose acetate silk a red shade.

Example 2

The diazo solution of Example 1 is coupled with one equivalent of m-β-hydroxyethylamino diphenylether as in Example 1. The dye compound obtained colors cellulose acetate silk a red shade.

Example 3

One gram mole of p-nitro-o-chloroaniline is diazotized and the diazonium compound obtained is coupled with one gram mole of m-di-β-hydroxyethylamino diphenylether as in Example 1. The dye compound obtained colors cellulose acetate silk a rubine shade.

Example 4

One gram mole of p-nitro-o-bromoaniline is diazotized and the diazonium compound obtained is coupled with one gram mole of

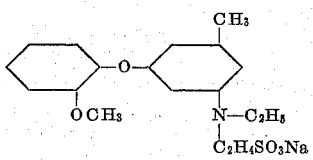

in a cold dilute sodium carbonate solution. The dye is salted out, filtered, washed and dried. It colors cellulose acetate silk a rubine shade.

Example 5

One gram mole of o-chloroaniline is diazotized in the usual manner and the diazonium compound obtained is coupled with one gram mole of

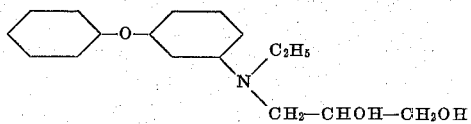

The dye compound obtained colors cellulose acetate silk a yellow shade.

Example 6

One gram mole of p-aminoacetophenone is diazotized and the diazonium compound obtained is coupled with one gram mole of

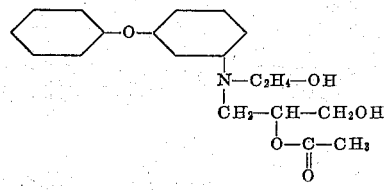

as in Example 1. The dye compound obtained colors cellulose acetate silk an orange shade.

Example 7

One gram mole of 2,4-dinitroaniline is diazotized and the diazonium compound obtained is coupled with one gram mole of m-di-β-hydroxyethylaminodiphenyl ether as in Example 1. The dye compound obtained colors cellulose acetate silk a wine shade.

Example 8

One gram mole of 2,4-dinitro-6-chloroaniline is diazotized and the diazonium compound obtained is coupled with one gram mole of

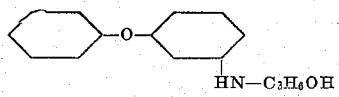

in acetic acid. Coupling is completed by adding sodium acetate; water is added and the dye is filtered off, washed and dried. The dye compound obtained colors cellulose acetate silk a violet shade.

The following tabulation further illustrates the compounds included within the scope of our invention together with the color they produce on cellulose acetate silk. The compounds indicated below may be prepared by diazotizing the amines listed under the heading "Amine" and coupling the diazonium compounds obtained with the compounds specified in the column entitled "Coupling component". The diazotization and coupling reactions may, for example, be carried out following the general procedure described in Examples 1 to 8, inclusive.

| Amine | Coupling component | Color on cellulose acetate silk |
|---|---|---|
| o-(Cl, Br, I)-aniline | 1. m-amino diphenyl ether | Yellow. |
| Do | 2. m-β-hydroxyethyl amino diphenyl ether | Do. |
| Do | 3. m-glyceryl amino diphenyl ether | Do. |
| Do | 4. m-β-sulfo ethyl amino diphenyl ether | Do. |
| Do | 5. m-cetyl amino diphenyl ether | Do. |
| Do | 6. m-di-β-hydroxyethyl amino diphenyl ether | Do. |
| Do | 7. m-di-glyceryl amino diphenyl ether | Do. |
| Do | 8. m-di-γ-chloro-β-hydroxypropyl amino diphenyl ether | Do. |
| Do | 9. m-β-hydroxyethyl glyceryl amino diphenyl ether | Do. |
| Do | 10. m-β-hydroxyethyl ethyl amino diphenyl ether | Do. |
| Do | 11. m-glyceryl ethyl amino diphenyl ether | Do. |
| Do | 12. m-β-cetyl sulfoethyl amino diphenyl ether | Do. |
| Do | 13. m-benzyl sulfatoethyl amino diphenyl ether | Do. |
| | 14. 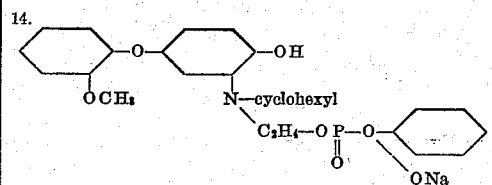 | |
| p-Nitroaniline | 1-14 above | Red. |
| p-Nitro-o-(F, Cl, Br, I) aniline | do | Rubine. |
| 2,4-dinitroaniline | do | Wine. |
| 2,4-dinitro-6-bromo (chloro) aniline | do | Violet. |
| 2,4,6-trinitroaniline | do | Red-blue. |
| p-Aminoazobenzene | do | Orange-red. |
| p-Aminoacetophenone | do | Orange. |

It will be understood that the foregoing examples and tabulation showing the preparation of various azo dye compounds included within the scope of our invention are intended to be illustrative and not limitative of the invention. To illustrate, the benzene nucleus which has been designated A may contain substitutents in addition to those shown in the compounds of the examples and tabulation. This benzene nucleus may also be substituted, for example, with an alkyl group such as ethyl or propyl, an alkoxy group such as methoxy or ethoxy, a nitro group and a halogen atom such as chlorine and bromine.

In order that the preparation of the azo dye compounds of our invention may be clearly understood, the preparation of various coupling components which may be employed in their manufacture is described hereinafter. The coupling components of the present invention can be prepared with comparative ease from chemicals which can be prepared at a low cost by either one of the following reactions. In the first method of preparation, a nitro-benzene nucleus containing a halogen atom in the m-position to the nitro group is reacted with an alkali metal phenolate and the compound prepared by this reaction is then reduced by standard reduction methods to convert the nitro group to an amino group. The compound resulting from this reduction may then be treated in known fashion to introduce the substituent groups, other than hydrogen, represented by $R_1$ and $R_2$. The main reactions in connection with this first method may be indicated as follows:

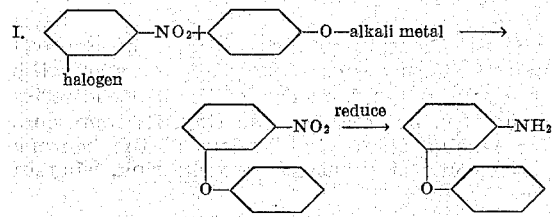

The second method of preparing the coupling components employed in the preparation of the azo dye compounds of our invention is to react m-halogenaniline with an alkali metal phenolate as indicated hereinafter:

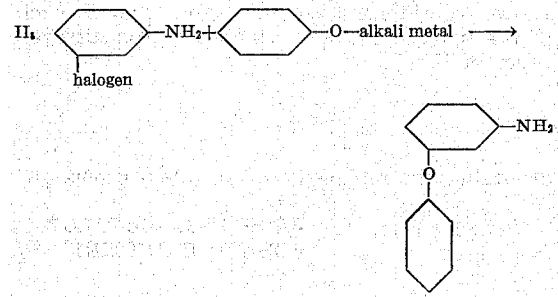

The compound thus obtained may be treated in known fashion to introduce the substituents represented by $R_1$ and $R_2$. Similarly, substituents may be introduced into the benzene nuclei of the coupling compounds by treatment in known manner for the introduction of the substituent group desired to be introduced. For further information as to the preparation of the coupling compounds, reference may be had to Annalen, vol. 350, page 103.

The azo dye compounds of our invention are, for the most part, relatively insoluble in water. Those compounds which are insoluble in water may be advantageously employed for the direct dyeing of textile materials by grinding the dye to a fine powder, intimately mixing it with a suitable dispersing or solubilizing agent, and adding the resulting mixture to water or a dilute solution of soap in water to form an aqueous dyebath. Following this known preparation of the dyebath, the textile materials to be dyed may be added to the dyebath and the dyeing operation conducted in known fashion. The dye compounds of our invention which are water soluble do not, of course, require the use of a dispersing or solubilizing agent but may be applied to silk, wool and (depending upon the nature and position of the water-solubilizing group) organic derivatives of cellulose textile materials from an aqueous solution of the dye which may contain salt. For a more complete description as to how the azo dye compounds of our invention may be employed in dyeing or coloring operations, reference may be had to our U. S. Letters Patent No. 2,115,030, issued April 26, 1938. For a more detailed description as to how the water soluble azo dyes of our invention may be employed for the coloration of textile materials made of or containing organic derivatives of cellulose, silk and wool or mixtures of these, reference may be had to our U. S. Letters Patent No. 2,107,898, issued February 8, 1938.

We claim:

1. The azo dye compounds having the general formula:

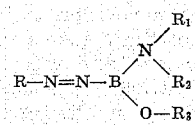

wherein R represents the residue of an aryl nucleus of the benzene series, B represents the residue of an aryl nucleus of the benzene series containing but one benzene ring, $R_1$ and $R_2$ each represents a member selected from the group consisting of hydrogen, an alkyl group, an allyl group, a cycloalkyl group, an aryl group and a heterocyclic group, $R_3$ represents the residue of an aryl nucleus of the benzene series containing but one benzene ring and wherein the

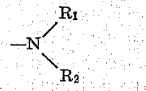

and the —O—$R_3$ groupings are attached to the benzene nucleus B in para and ortho position, respectively, to the azo bond.

2. The azo dye compounds having the general formula:

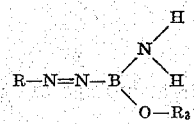

wherein R represents the residue of an aryl nucleus of the benzene series, B represents the residue of an aryl nucleus of the benzene series containing but one benzene ring, $R_3$ represents the residue of an aryl nucleus of the benzene series containing but one benzene ring, wherein the

and the —O—$R_3$ groupings are attached to the benzene nucleus B in para and ortho position, respectively, to the azo bond and wherein each of the hydrogen atoms attached to the nitrogen atom of the

group may be replaced with an alkyl group.

3. The azo dye compounds having the general formula:

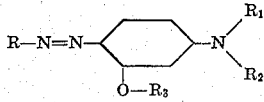

wherein R represents the residue of an aryl nucleus of the benzene series containing but one benzene ring, $R_1$ and $R_2$ each represents a member selected from the group consisting of hydrogen, an alkyl group, an allyl group, a cycloalkyl group, an aryl group and a heterocyclic group and $R_3$ represents the residue of an aryl nucleus of the benzene series containing but one benzene ring.

4. The azo dye compounds having the general formula:

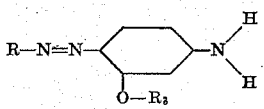

wherein R and $R_3$ each represents the residue of an aryl nucleus of the benzene series containing but one benzene ring and wherein each of the hydrogen atoms attached to the nitrogen atom may be replaced by an alkyl group.

5. Material made of or containing an organic derivative of cellulose colored with a nuclear non-sulfonated azo dye compound having the general formula:

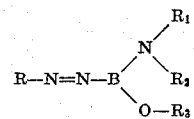

wherein represents the residue of an aryl nucleus of the benzene series, B represents the residue of an aryl nucleus of the benzene series containing but one benzene ring, $R_1$ and $R_2$ each represents a member selected from the group consisting of hydrogen, an alkyl group, an allyl group, a cycloalkyl group, an aryl group and a heterocyclic group, $R_3$ represents the residue of an aryl nucleus of the benzene series containing but one benzene ring and wherein the

and the —O—$R_3$ groupings are attached to the benzene nucleus B in para and ortho position, respectively, to the azo bond.

6. A cellulose acetate colored with a nuclear nonsulfonated azo dye compound having the general formula:

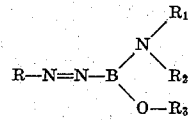

wherein R represents the residue of an aryl nucleus of the benzene series, B represents the residue of an aryl nucleus of the benzene series containing but one benzene ring, $R_1$ and $R_2$ each represents a member selected from the group consisting of hydrogen, an alkyl group, an allyl group, a cycloalkyl group, an aryl group and a heterocyclic group, $R_3$ represents the residue of an aryl nucleus of the benzene series containing but one benzene ring and wherein the

and the —O—$R_3$ groupings are attached to the benzene nucleus B in para and ortho position, respectively, to the azo bond.

7. A cellulose acetate colored with a nuclear nonsulfonated azo dye compound having the general formula:

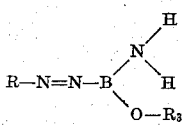

wherein R represents the residue of an aryl nucleus of the benzene series, B represents the residue of an aryl nucleus of the benzene series containing but one benzene ring, $R_3$ represents the residue of an aryl nucleus of the benzene series containing but one benzene ring, wherein the

and the —O—$R_3$ groupings are attached to the benzene nucleus B in para and ortho position, respectively, to the azo bond and wherein each of the hydrogen atoms attached to the nitrogen atom of the

group may be replaced with an alkyl group.

JAMES G. McNALLY.
JOSEPH B. DICKEY.